United States Patent
Abrari

(10) Patent No.: US 10,837,287 B2
(45) Date of Patent: Nov. 17, 2020

(54) MISTUNED BLADED ROTOR AND ASSOCIATED MANUFACTURING METHOD

(71) Applicant: PRATT & WHITNEY CANADA CORP., Longueuil (CA)

(72) Inventor: Farid Abrari, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 463 days.

(21) Appl. No.: 15/411,236

(22) Filed: Jan. 20, 2017

(65) Prior Publication Data
US 2018/0209275 A1  Jul. 26, 2018

(51) Int. Cl.
| | |
|---|---|
| *F01D 5/16* | (2006.01) |
| *F01D 5/04* | (2006.01) |
| *F04D 29/30* | (2006.01) |
| *F01D 5/14* | (2006.01) |
| *F04D 29/28* | (2006.01) |

(Continued)

(52) U.S. Cl.
CPC ............ *F01D 5/16* (2013.01); *B33Y 80/00* (2014.12); *F01D 5/046* (2013.01); *F01D 5/048* (2013.01); *F01D 5/147* (2013.01); *F01D 5/18* (2013.01); *F04D 29/284* (2013.01); *F04D 29/30* (2013.01); *F04D 29/324* (2013.01); *F04D 29/666* (2013.01); *F04D 29/384* (2013.01); *F05D 2230/31* (2013.01); *F05D 2230/42* (2013.01); *F05D 2240/301* (2013.01);

(Continued)

(58) Field of Classification Search
CPC . F01D 5/16; F01D 5/046; F01D 5/048; F01D 5/147; F01D 5/18; F01D 5/10; F01D 5/34; F01D 5/141; F01D 5/027; F01D 5/045; F01D 25/04; F01D 5/22; B33Y 80/00; F04D 29/284; F04D 29/30; F04D 29/324; F04D 29/666; F04D 29/384; F05D 2230/31; F05D 2230/42; F05D 2240/301; F05D 2250/291; F05D 2260/961; Y02T 50/673; Y02T 50/676; Y02T 50/671; Y10S 416/50

See application file for complete search history.

(56) References Cited

U.S. PATENT DOCUMENTS 3,582,232 A * 6/1971 Okapuu .................. F01D 5/046
                                                       416/188
4,587,700 A * 5/1986 Curbishley ........... B23P 15/006
                                                       219/121.72

(Continued)

OTHER PUBLICATIONS

Dr. Rer. Nat. Burghardt Kloden, Additive Manufacturing—Selective Electron Beam Melting, Fraunhofer Institute for Manufacturing Technology and Advanced Materials IFAM, Branch Lab Dresden, Germany, http://www.fam.fraunhofer.de/content/dam/ifam/en/documents/dd/Infobl%C3%A4tter/additive_manufacturing-electron_beam_melting_fraunhofer_ifam_dresden.pdf, accessed on Nov. 10, 2016.

*Primary Examiner* — Courtney D Heinle
*Assistant Examiner* — Eric J Zamora Alvarez
(74) *Attorney, Agent, or Firm* — Norton Rose Fulbright Canada LLP

(57) ABSTRACT

Mistuned bladed rotors and associated manufacturing methods are disclosed. An exemplary method includes forming two or more blades of the bladed rotor where the two or more blades have substantially identical external aerodynamic surfaces and have different internal configurations causing the two or more blades to have different natural frequencies.

16 Claims, 7 Drawing Sheets

(51) Int. Cl.
    *F04D 29/66* (2006.01)
    *F04D 29/38* (2006.01)
    *B33Y 80/00* (2015.01)
    *F01D 5/18* (2006.01)
    *F04D 29/32* (2006.01)

(52) U.S. Cl.
    CPC .. *F05D 2250/291* (2013.01); *F05D 2260/961* (2013.01); *Y02T 50/673* (2013.01); *Y02T 50/676* (2013.01)

(56) References Cited

U.S. PATENT DOCUMENTS

| | | | |
|---|---|---|---|
| 7,147,437 B2* | 12/2006 | Burdgick | F01D 5/147 |
| | | | 416/1 |
| 7,500,299 B2* | 3/2009 | Dupeux | F01D 5/10 |
| | | | 29/407.07 |
| 8,043,063 B2 | 10/2011 | Kelly et al. | |
| 8,172,510 B2* | 5/2012 | Duong | F04D 29/284 |
| | | | 415/119 |
| 9,289,826 B2 | 3/2016 | Morris et al. | |
| 9,393,620 B2 | 7/2016 | Bales et al. | |
| 2014/0169971 A1 | 6/2014 | Vedula et al. | |
| 2014/0348664 A1* | 11/2014 | Jan | F01D 5/081 |
| | | | 416/96 R |
| 2015/0322803 A1* | 11/2015 | Fulayter | F01D 5/26 |
| | | | 416/231 B |
| 2016/0003056 A1 | 1/2016 | Xu | |
| 2016/0222797 A1 | 8/2016 | Chouhan | |

* cited by examiner

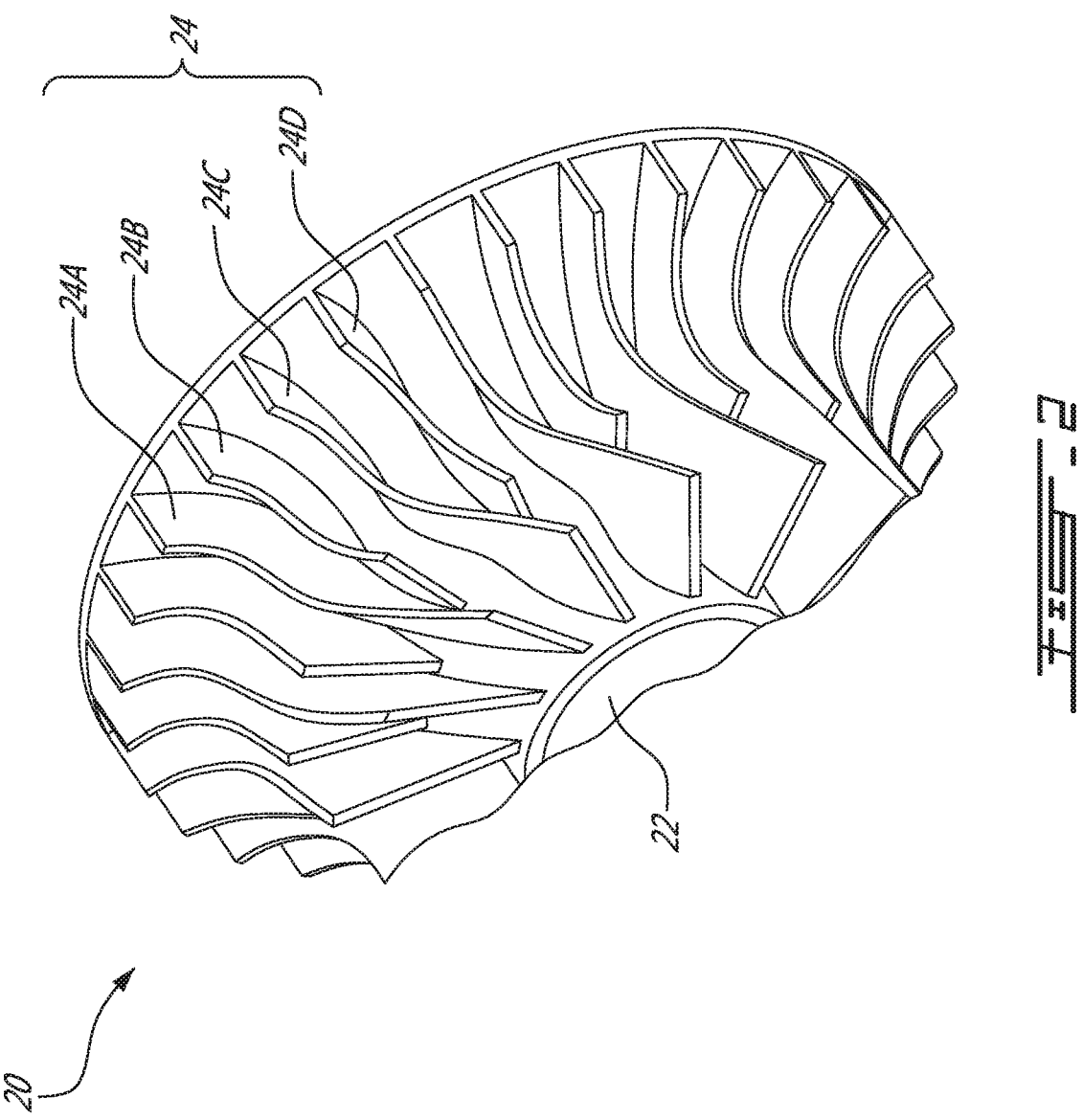

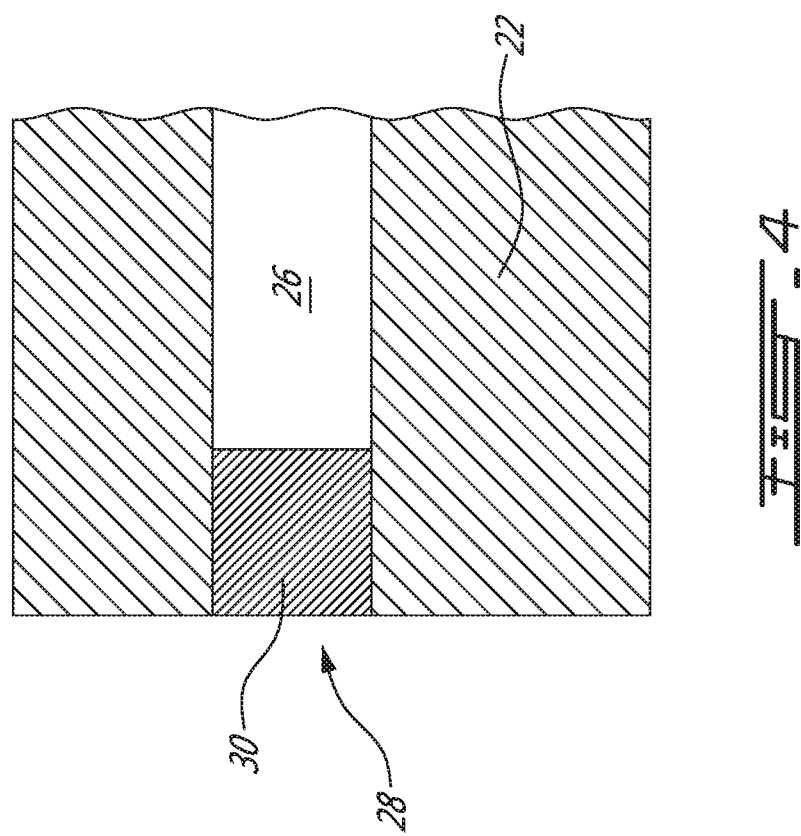

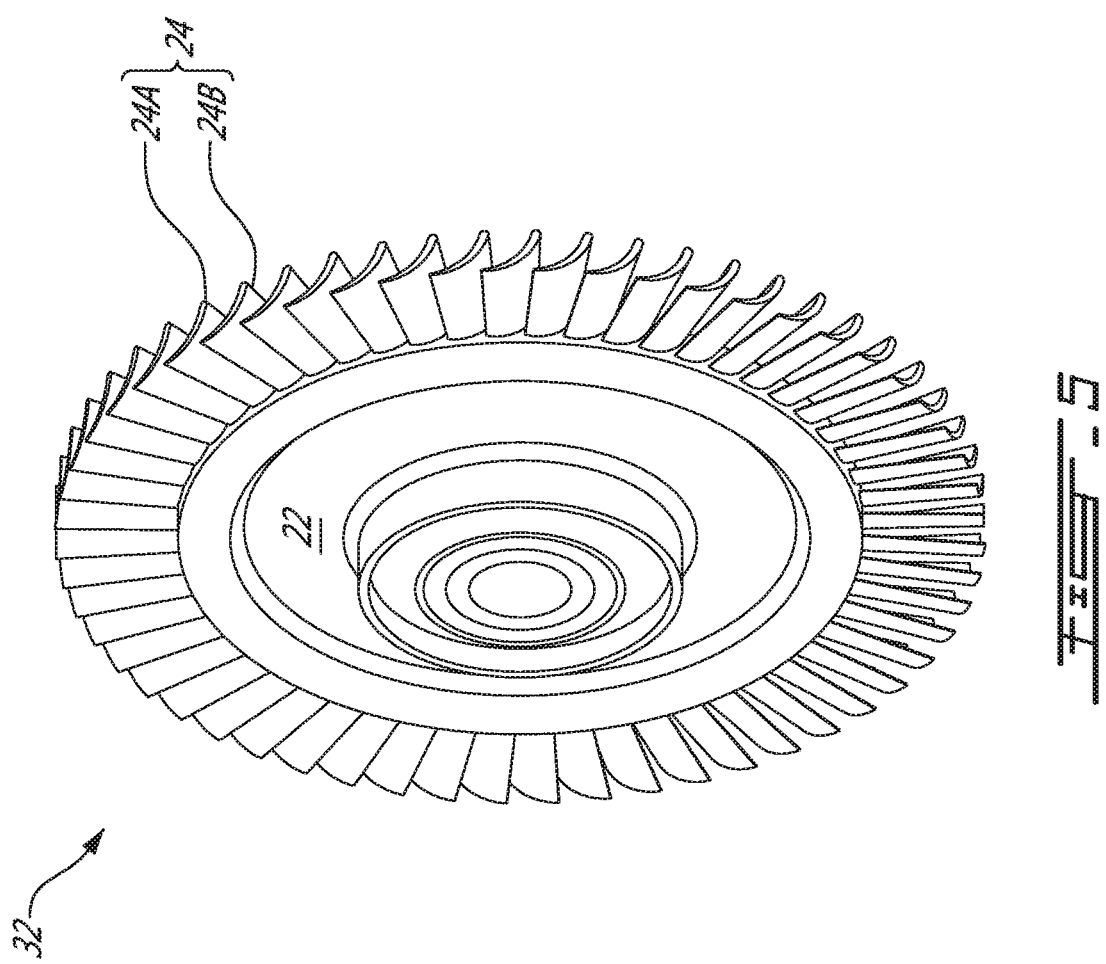

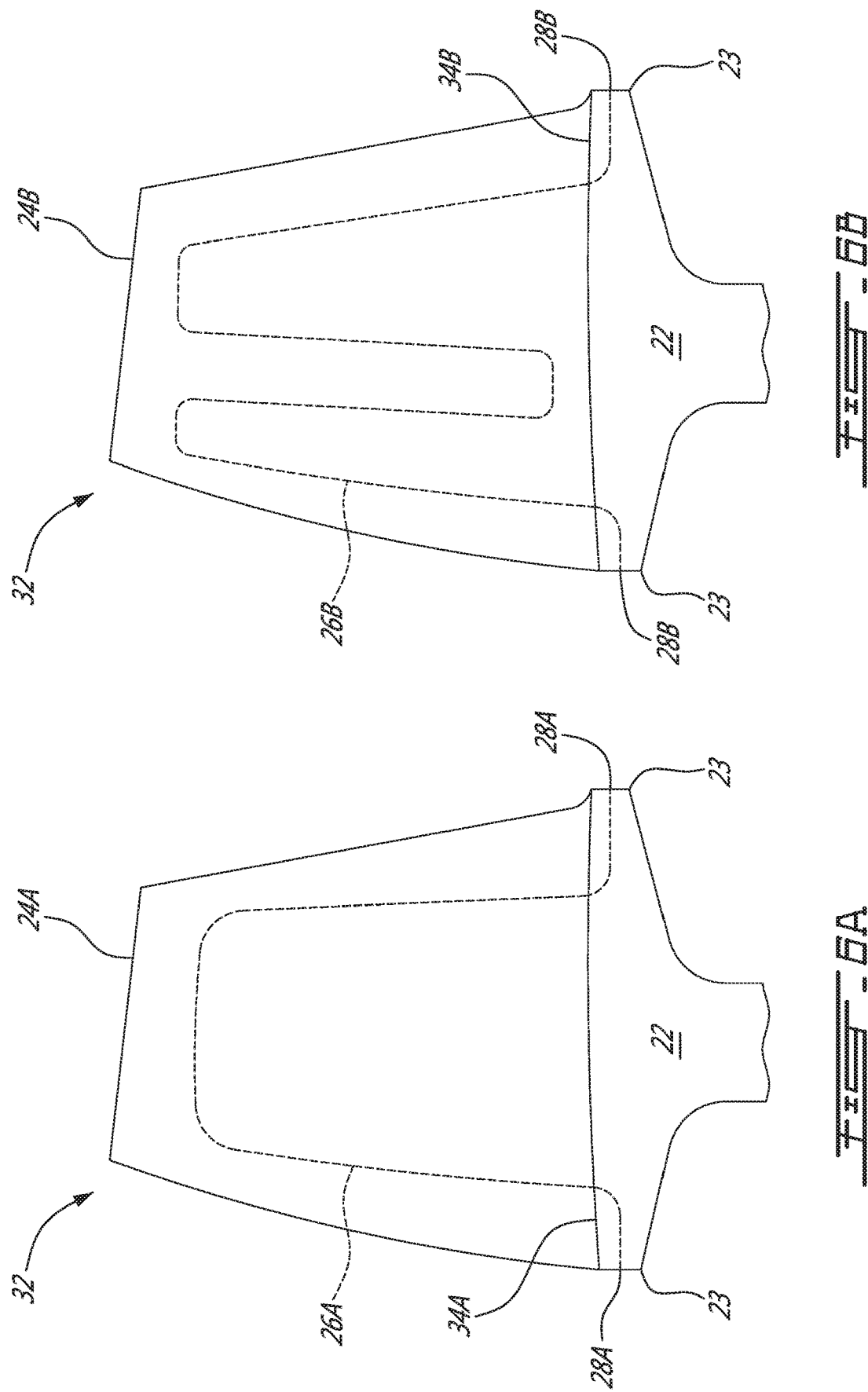

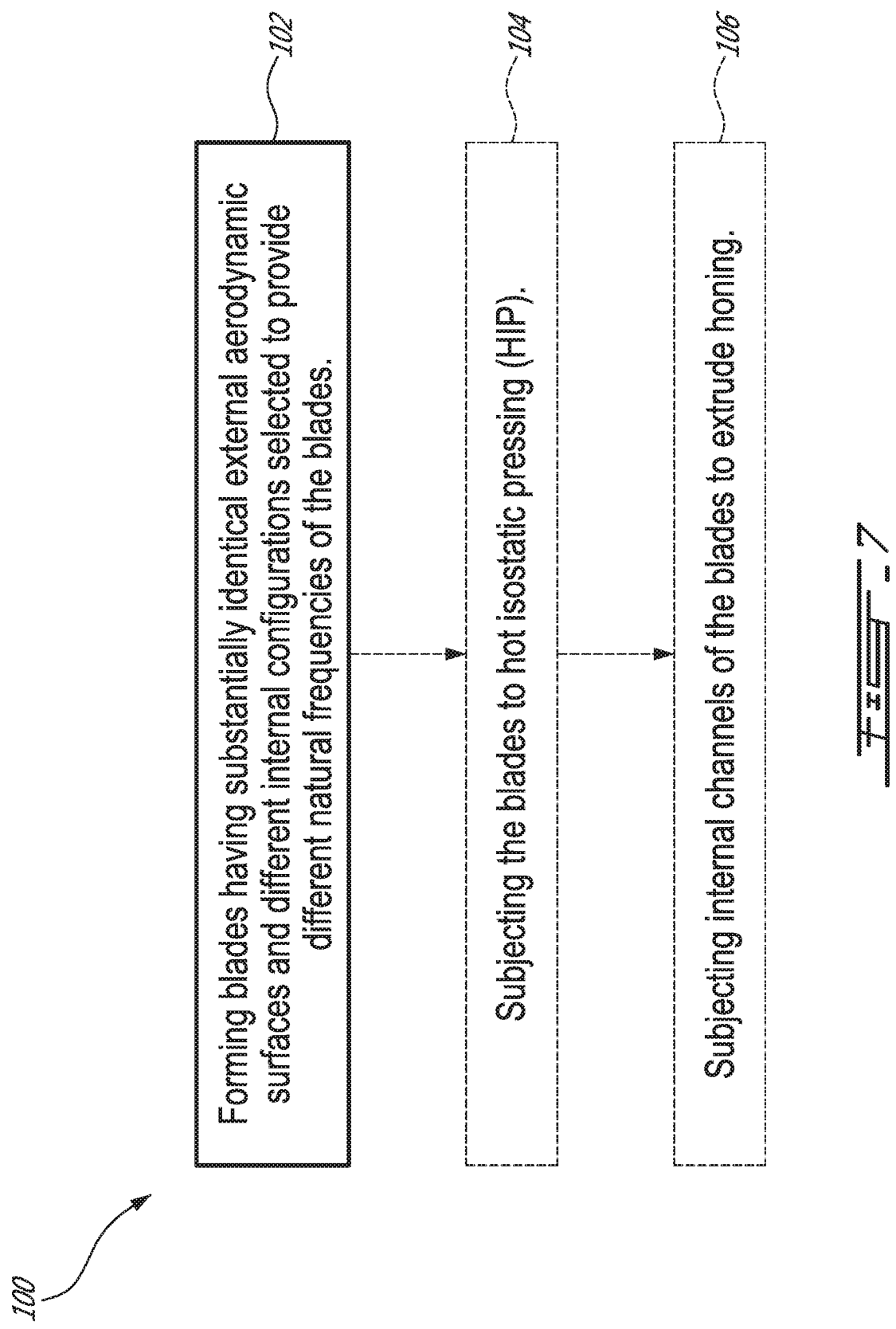

MISTUNED BLADED ROTOR AND ASSOCIATED MANUFACTURING METHOD

TECHNICAL FIELD

The disclosure relates generally to turbine engines, and more particularly to bladed rotors of turbine engines.

BACKGROUND OF THE ART

Gas turbine engines comprise bladed rotors in their turbine and compressor sections where such rotors each comprises a circumferential row of blades secured to a hub. The blades in a row of such rotor are typically formed to have identical airfoil shapes. It has been found that the uniformity between the blades of a rotor can, in some situations, increase the bladed rotor's susceptibility to vibration problems such as resonant vibration occurring at a multiple of rotation speed and flutter resulting from aerodynamic perturbations. The manifestation of such vibration problems could potentially raise some concerns relating to high-cycle fatigue in some situations. Improvement is desirable.

SUMMARY

In one aspect, the disclosure describes a bladed rotor comprising blades of two or more different blade types. The different blade types define substantially identical external aerodynamic surfaces and different internal configurations selected to provide different natural frequencies of the blades of the different blade types.

The blades of the different blade types may have continuous internal channels of different shapes where each internal channel extends between two openings to an exterior of the bladed rotor.

The blades of the different blade types may have blade root fillets of different geometries.

Embodiments may include combinations of the above features.

In another aspect, the disclosure describes a mistuned bladed rotor comprising a plurality of circumferentially distributed blades. Two or more of the blades have substantially identical external aerodynamic surfaces and have different internal configurations selected to provide the two or more blades with different natural frequencies.

The two or more blades may have internal cavities of different shapes.

A first of the two or more blades may comprise an internal channel extending between two openings to an exterior of the bladed rotor.

The two openings may be located on a same side of a hub of the bladed rotor.

The two openings may be located on opposite axial sides of a hub of the bladed rotor.

The two openings may be occluded by respective plugs.

The internal channel may extend into a hub of the bladed rotor.

The openings may be located in a rim portion of a hub of the bladed rotor.

The bladed rotor may be a centrifugal impeller.

The bladed rotor may be a bladed disk.

The two or more blades may be adjacent one another.

Embodiments may include combinations of the above features.

In a further aspect, the disclosure describes a method of manufacturing a mistuned bladed rotor. The method comprises forming blades of the rotor according to two or more different blade types where the different blade types define substantially identical external aerodynamic surfaces and different internal configurations selected to provide different natural frequencies of the blades of the different blade types.

The method may comprise using additive manufacturing to form the blades.

The blades of the different blade types may have continuous internal channels of different shapes. Each internal channel may extend between two openings to an exterior of the bladed rotor.

The method may comprise subjecting the blades to hot isostatic pressing and subjecting the internal channels to abrasive flow machining.

The method may comprise occluding the two openings using respective plugs.

The blades of the different blade types may have root fillets of different geometries.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 2 shows a partial perspective view of an exemplary centrifugal impeller of the turbine engine of FIG. 1;

FIG. 4 shows a schematic cross-sectional view through an opening of an internal channel in a blade of the centrifugal impeller of FIG. 2 or of the bladed disk of FIG. 5;

FIG. 5 shows a perspective view of an exemplary bladed disk of the turbine engine of FIG. 1;

FIGS. 6A and 6B show partial schematic axial cross-sectional views of the bladed disk of FIG. 5 showing two different blades of the bladed disk; and FIG. 7 shows a flow diagram of a method of manufacturing a mistuned bladed rotor.

DETAILED DESCRIPTION

The present disclosure describes intentionally mistuned bladed rotors for turbine engines. In some embodiments, such mistuned bladed rotors may have a relatively lower susceptibility to vibration problems such as resonant vibration and flutter for example. Also described herein are methods for manufacturing such mistuned bladed rotors using additive manufacturing. In some cases, the use of additive manufacturing may provide some flexibility and freedom with designing the internal geometry of the blades. For example, blades that have substantially identical external aerodynamic surfaces (i.e., substantially identical airfoil shapes) and that have different internal configurations, and hence different natural frequencies, may be produced on a same bladed rotor to provide a mistuned bladed rotor.

As referenced in the present disclosure, additive manufacturing includes processes of joining materials to make objects from 3D model data, usually layer upon layer, as opposed to subtractive manufacturing methodologies. Additive manufacturing processes are sometimes also referred to as 3D printing, additive fabrication, additive processes, additive techniques, additive layer manufacturing, layer manufacturing, and freeform fabrication. For example, additive manufacturing can include directed energy deposition where focused thermal energy is used to fuse material(s) (e.g., in powder form) by melting as it/they is/are being deposited. Material additive processes that may be used for adding functional metallic components to a substrate may be suitable.

Such additive manufacturing process may include a suitable laser-based material additive process such as a laser material (e.g., powder) deposition process. For example, a suitable additive manufacturing process may comprise irradiating a laser beam onto a metallic substrate to produce a molten pool of metal into which a metallic powder is injected in order to increase the size of the molten pool and simultaneously causing movement between the laser beam/powder stream and the substrate along a desired trajectory to build a layer of the feature that is added. The addition (i.e., stacking) of subsequent layers may be used to achieve a desired height and geometry of the added feature. Such additive manufacturing process may make use of a multi-axis computer numerical control (CNC) system to cause movement between the laser beam/powder stream and the substrate in order to add a feature of desired geometry.

Aspects of various embodiments are described through reference to the drawings.

Figure 1:
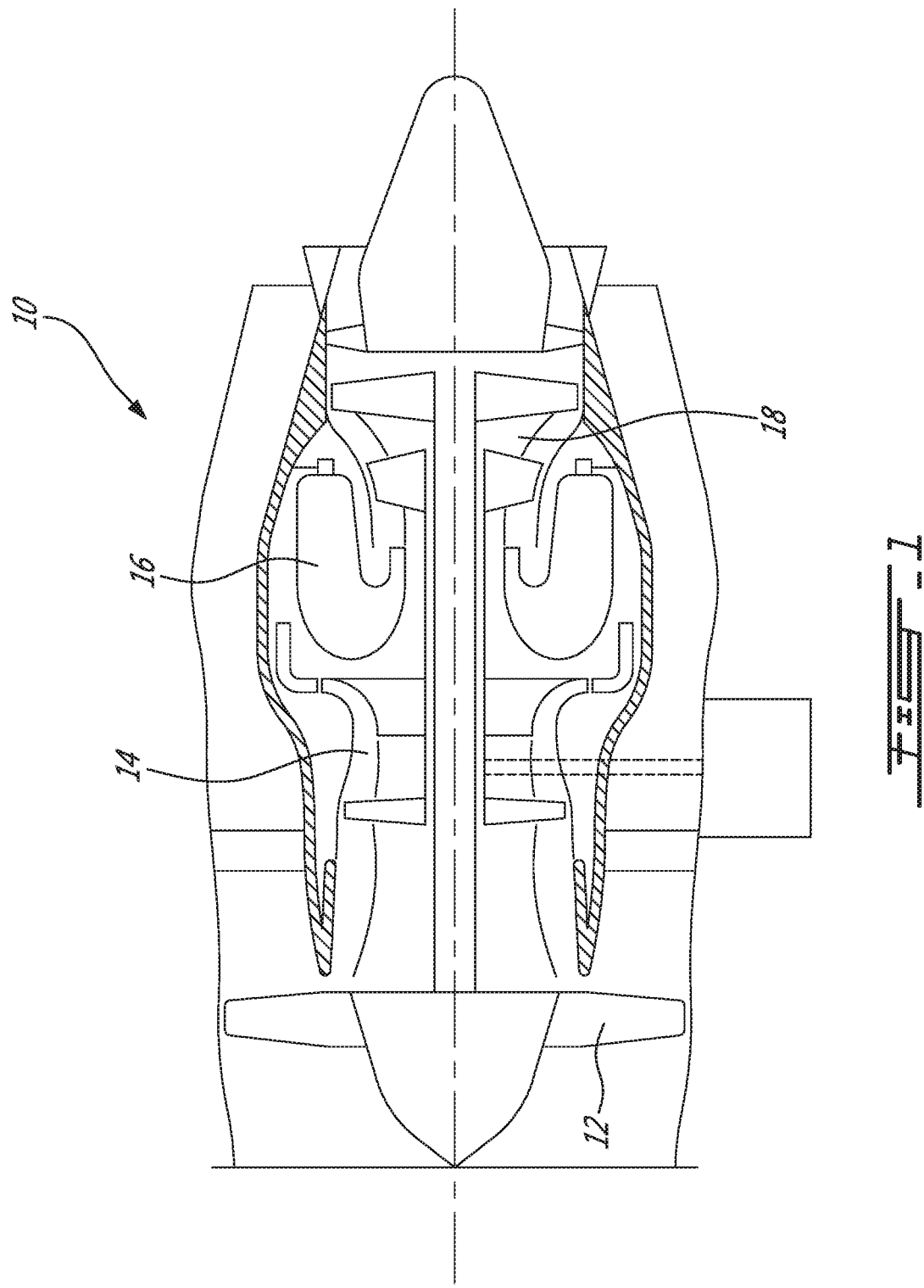
FIG. 1 shows an axial cross-sectional view of an exemplary turbo-fan gas turbine engine.

FIG. 1 shows an axial cross-sectional view of an exemplary turbo-fan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. Turbine engine 10 may be suitable for use in aircraft applications. Alternatively, gas turbine engine 10 may be configured for a ground-based industrial application such as power generation.

FIG. 2 shows a partial perspective view of an exemplary centrifugal impeller 20, which may be part of compressor 14 of turbine engine 10. It is understood that aspects of the present disclosure may also be applicable to other types of bladed rotors where intentional mistuning may be desired. For example, aspects of the present disclosure may also be applicable to bladed disks (e.g., illustrated in FIG. 5), to fan 12 and/or to mixed flow rotors where both radial and axial flow velocity components are present.

Centrifugal impeller 20 may comprise hub 22 and a plurality of blades 24 secured thereto. Hub 22 and blades 24 may be made from suitable metallic material(s). The plurality of blades 24 may be arranged in a row of radially extending blades 24 circumferentially distributed about hub 22. In various embodiments, all of blades 24 may have substantially identical external shapes so as to have substantially identical external aerodynamic surfaces. Alternatively, all of blades 24 may not necessarily have substantially identical external shapes as illustrated in FIG. 2. The exemplary embodiment of centrifugal impeller 20 of FIG. 2 shows blades 24 of two different external shapes and sizes that are alternatingly and circumferentially distributed about hub 22. For example, blades 24A and 24C are shown as being axially longer than blades 24B and 24D.

Blades 24 may be integrally formed with hub 22. For example, blades 24 may be formed (i.e., built-up, grown, added) using additive manufacturing or other suitable process(es). In some embodiments, hub 22 may also be formed using additive manufacturing either during or before the forming of blades 24. Alternatively, hub 22 may be manufactured using one or more conventional manufacturing processes other than additive manufacturing such as casting, machining and/or forging so as to serve as a substrate onto which blades 24 may be subsequently formed using additive manufacturing. In any case, the use of additive manufacturing may provide a sound (e.g., metallurgical) bond between blades 24 and hub 22.

Figure 3B:
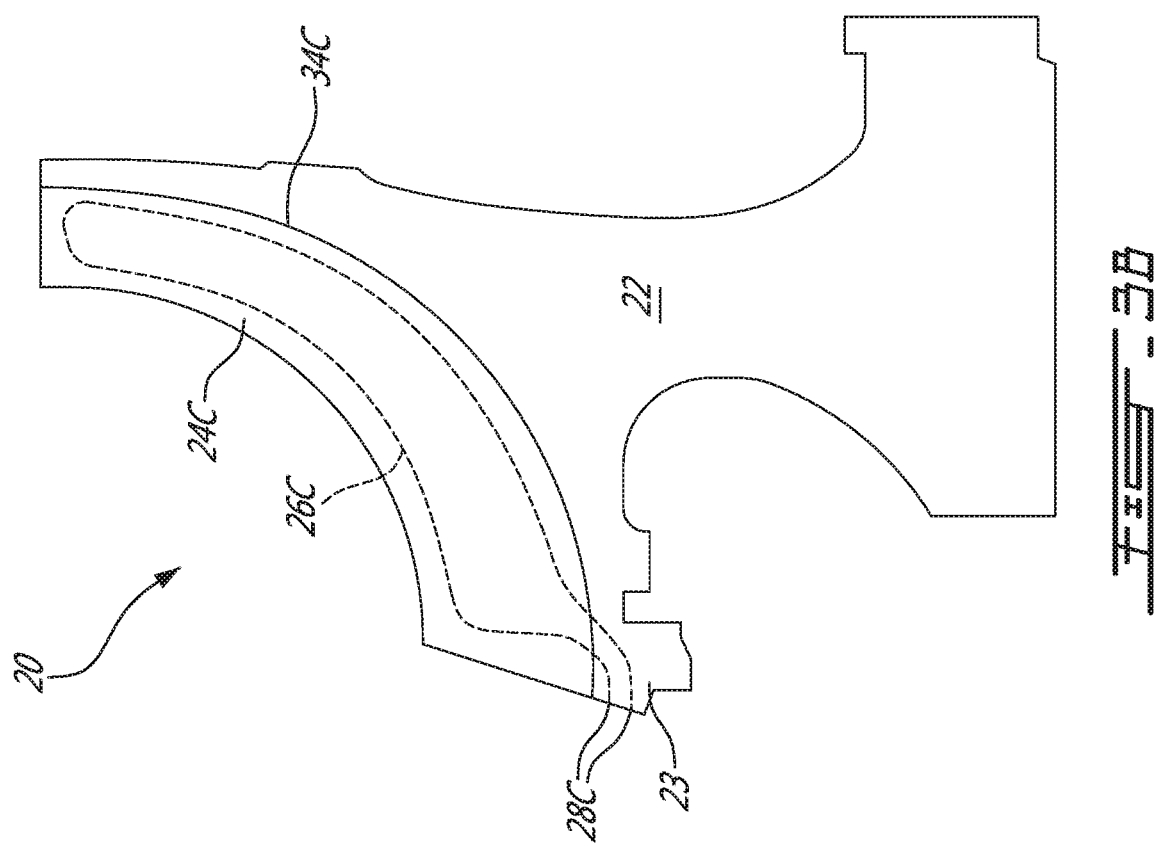
FIGS. 3A and 3B show partial schematic axial cross-sectional views of the centrifugal impeller of FIG. 2 showing two different blades of the centrifugal impeller.
Figure 3A:
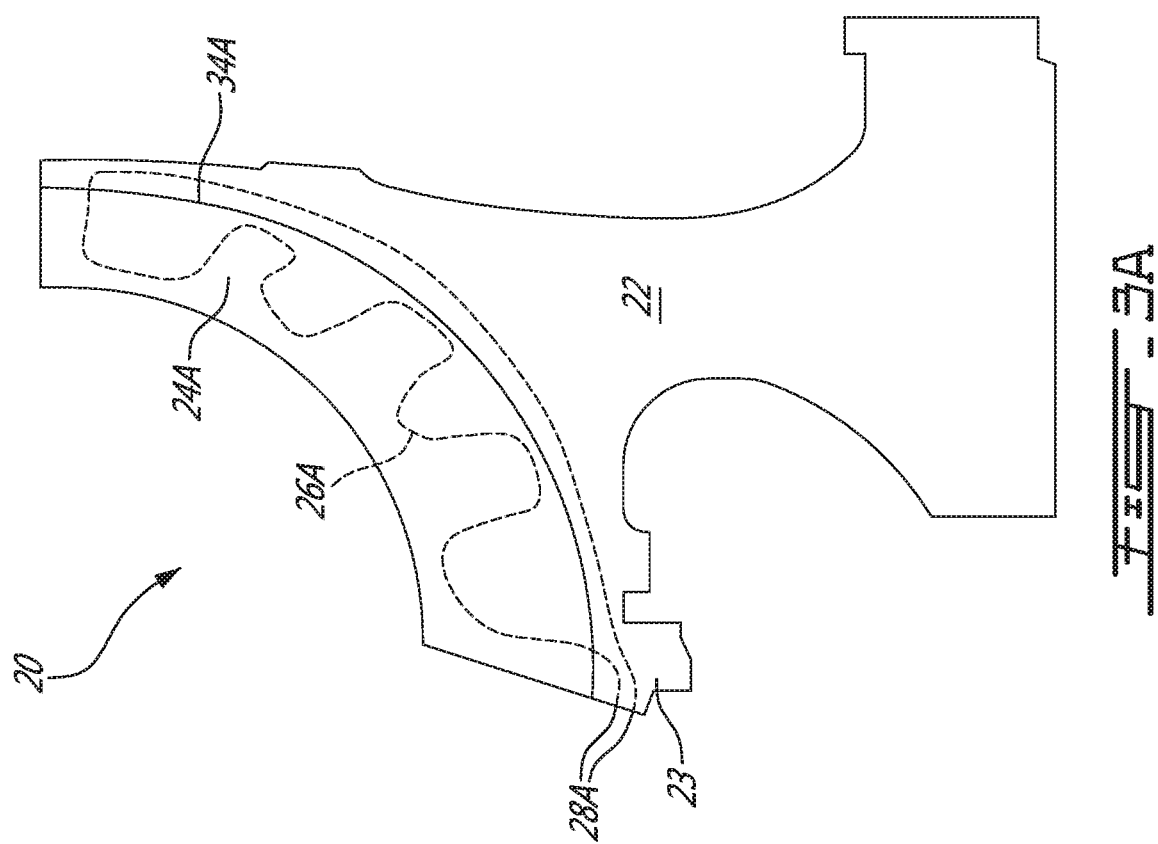

FIGS. 3A and 3B show partial schematic axial cross-sectional views of centrifugal impeller 20 respectively showing two different blades 24A and 24C of centrifugal impeller 20. In some embodiments, blades 24A and 24C may be circumferentially disposed adjacent one another on hub 22. Alternatively, one or more other blades (e.g., blade 24B) may be disposed between blades 24A and 24C as shown in FIG. 2.

Centrifugal impeller 20 may be intentionally mistuned so that some of its blades (e.g., blades 24A and 24C) may have substantially identical external airfoil shapes, and hence substantially identical external aerodynamic surfaces but have different internal configurations in order to cause such blades 24 to have different natural frequencies. As opposed to having all of the blades 24 with identical natural frequencies, such intentional mistuning by way of different internal configurations may cause centrifugal impeller 20 to have more desirable dynamic properties in some applications. For example, such mistuning may, in some embodiments, reduce the likelihood of resonant vibration or of flutter, which can occur when two or more adjacent blades in a row of blades are caused to vibrate at a frequency close to their natural frequency and the vibrating motion of the adjacent blades is substantially in phase.

Blades 24A and 24C may be considered to be of two different blade types defining substantially identical external airfoil shapes and two different natural frequencies selected to provide meaningful mistuning. For example, blade 24A may be of a first blade type having a first selected natural frequency and blade 24C may be of a second blade type having a second selected natural frequency that is intentionally different from the first selected natural frequency. It is understood that a rotor could have blades 24 of more than two blade types. As explained herein, the different selected natural frequencies of blades 24A, 24C may be achieved by way of different internal configurations and/or by way of different geometries of blade root fillets 34. It is understood that the difference in the selected natural frequencies for the two blade types to achieve meaningful mistuning may be different for different applications. For example, in some embodiments, the difference in the selected natural frequencies for the two blade types may be about 3%. In some embodiments, the difference in the selected natural frequencies for the two blade types may be greater than about 3%. In some embodiments, the difference in the selected natural frequencies for the two blade types may be between about 3% and about 10%.

The use of additive manufacturing may allow blades 24 of substantially identical external shapes to be formed with different internal configurations. The different internal configurations may be selected to obtain a desired mass and stiffness distribution within each blade 24 to influence the respective natural frequencies of blades 24. Accordingly, the use of additive manufacturing may allow mistuning of blades 24 without having to alter the external shapes of different blades 24 of centrifugal impeller 20. For example, in order to obtain blades 24 with different natural frequencies, cavities of different shapes and/or sizes may be included inside of blades 24. For example, one or more blades 24 may be formed with a completely solid interior (i.e., no internal cavity) and one or more blades 24 may be formed with one or more internal cavities to obtain blades 24 or sets of blades 24 with different natural frequencies.

As shown in FIGS. 3A and 3B, blades 24A and 24C may be formed with respective internal channels 26A and 26C (referred generally as "internal channels 26") of different shapes (e.g., sizes, lengths, paths, etc.) and shown in stippled lines. In some embodiments, one or more of internal channels 26 or portions thereof may extend into hub 22. Alternatively, in some embodiments, one or more of internal channels 26 could be disposed entirely into their respective blades 24. In some embodiments, blades 24A and 24C may each respectively comprise a continuous internal channel 26A, 26C extending between two openings 28A, 28C (referred generally as "openings 28") to an exterior of centrifugal impeller 20. In some embodiment, each blade 24 may comprise a plurality of internal channels 26 and/or one or more other types of cavities formed therein. For example, in some embodiments, each blade 24 may comprise one or more internal cavities (not shown) that may be substantially identical from blade to blade and comprise one or more internal cavities that are different from blade to blade for the purpose of mistuning.

In some embodiments, internal channels 26 may extend continuously (i.e., be uninterrupted) between their respective two openings 28 to the exterior of the centrifugal impeller 20. Alternatively, in some embodiments, internal channels 26 or other cavity(ies) may not necessarily comprise such openings 28 (i.e., they may be closed). In cases, where openings 28 are present, internal channels 26 may be used to carry a flow (e.g., cooling) fluid for example. Alternatively, openings 28 may be occluded prior to use (see FIG. 4) and internal channels 26 may not necessarily be used to carry a flow of fluid therethrough during operation.

In some embodiments, the presence of openings 28 may be advantageous during manufacturing of centrifugal impeller 20 for providing access to internal channels 26 for the purpose of extrude honing (i.e., abrasive flow machining) of internal channels 26 for example. The presence of two openings 28A, 28C (e.g., an entrance and an exit) to each internal channel 26 may permit an abrasive-laden fluid to be flowed through each channel 26 for the purpose of improving the internal surface finish of internal channels 26 and thereby removing or reducing the severity of potential stress concentrations that could otherwise potentially serve as fatigue crack initiation sites. Openings 28 may also permit the insertion of a borescope into internal channels 26 for inspection after manufacturing of the rotor or during overhaul for example.

In some embodiments, the two openings 28 of the same internal channel 26 may be located on a same side of hub 22 of centrifugal impeller 20. For example, as shown in FIGS. 3A and 3B, openings 28 may both be located on an axially forward side of centrifugal impeller 20. Alternatively, in some embodiments, openings 28 may be located on opposite axial sides of centrifugal impeller 20. The locations of openings 28 may be selected so that they may be occluded by one or more adjacent rotors when centrifugal impeller 20 (or other type of bladed rotor) is installed in turbine engine 10. For example, openings 28 may be at a location that is radially offset from a gas path and on a surface of hub 22 that abuts part of another adjacent rotor when installed in turbine engine 10 so that openings 28 may be partially or fully occluded by such adjacent rotor. In various embodiments, openings 28 may be located in a relatively low stress region of hub 22. For example, in some embodiments, openings 28 may be located in a rim portion 23 of hub 22.

The use of additive manufacturing for the forming of blades 24 may also provide some flexibility in varying the design of blade root fillets 34 (e.g., 34A, 34C) of blades 24 along the gas path. For example, a blade root fillet 34 could be varied in dimension and/or in geometry hence allowing to reduce the fillet radius where a larger fillet is not required and inversely to increase the fillet radius or change its shape locally where it is structurally mandated. In some embodiments, the geometry of blade root fillet 34 may be varied from blade 24 to blade 24 for the purpose of mistuning. For example, blade 24A may have a blade root fillet 34A having a first geometry and blade 24C may have a blade root fillet 34C having a second geometry that is different from the first geometry so that blade 24A and blade 24C may have different natural frequencies.

FIG. 4 shows a schematic cross-sectional view through an exemplary opening 28 to internal channel 26 formed in the hub 22 of centrifugal impeller 20. Instead of or in addition to being occluded by an adjacent rotor, one or more of openings 28 may be occluded by a respective plug 30 prior to operation. For example, such plug 30 may be inserted into one or more of openings 28 after extrude honing of the associated internal channel(s) 26. In some embodiments, plug 30 may be made from a material that has a lower density than a material of hub 22. For example, in some embodiments, plug 30 may be made of a suitable plastic such as polyether ether ketone (PEEK) for example. In various embodiments, internal channel(s) 26 may be left substantially empty or may be at least partially filled with a material that has a lower density than the material of blade(s) 24.

FIG. 5 shows a perspective view of an exemplary bladed disk 32 of turbine engine 10 as another exemplary embodiment of a bladed rotor to which aspects of the present disclosure may be applied. Bladed disk 32 may be of the type suitable for use in compressor 14 or turbine section 18 of turbine engine 10. In some embodiments, all of blades 24 in the circumferential row of blades 24 of bladed disk 32 may have substantially identical external shapes so as to have substantially identical aerodynamic surfaces but two or more blades 24 may have different internal configurations and hence have different natural frequencies from each other. In some embodiments, the two or more blades 24 having different natural frequencies may be located adjacent one another in the circumferential row of blades 24 of bladed disk 32 (e.g., see adjacent blades 24A and 24B).

FIGS. 6A and 6B show partial schematic axial cross-sectional views of the bladed disk 32 respectively showing two adjacent blades 24A and 24B of bladed disk 32. Bladed disk 32 may be intentionally mistuned so that some of its blades (e.g., blades 24A and 24B) may have substantially identical external shapes, and hence substantially identical external aerodynamic surfaces but have different internal configurations in order to cause such blades 24 to have different natural frequencies. Aspects of blades 24 and internal passages 26 described above in relation to centrifugal impeller 20 also apply to bladed disk 32 and such description is therefore not repeated. Like elements are identified using like reference numerals.

As illustrated in FIGS. 6A and 6B, openings 28 may be located on opposite axial sides of bladed disk 32. Alternatively, in some embodiments, openings 28 may be located on the same axial side of bladed disk 32 in a manner similar to that of centrifugal impeller 20 described above.

FIG. 7 shows a flow diagram of a method 100 of manufacturing a mistuned bladed rotor such as, for example, centrifugal impeller 20 or bladed disk 32 described above. In various embodiments, method 100 may comprise forming (e.g., using an additive manufacturing process) two or more blades 24 of the bladed rotor where the two or more blades 24 have substantially identical external aerodynamic surfaces and different internal configurations causing the two or more blades 24 to have different natural frequencies (see block 102).

In various embodiments, blades 24 formed in method 100 may comprise features previously described above or illustrated herein in relation to centrifugal impeller 20 and bladed disk 32.

Optionally, method 100 may comprise subjecting the two or more blades 24 (or the entire bladed rotor) to a hot isostatic pressing (HIP) process of suitable type to improve one or more mechanical properties of blades 24 after their forming using additive manufacturing for example (see block 104). The application of the HIP process may be beneficial for some applications and may induce compressive residual stresses in the surfaces of internal channels 26.

Optionally, method 100 may comprise subjecting internal channels 26 of the two or more blades 24 to extrude honing (abrasive flow machining) via openings 28 to internal channels 26 as described above (see block 106).

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A bladed rotor comprising blades of two or more different blade types, each of the different blade types defining an identical external aerodynamic surface and a different internal configuration selected to provide different natural frequencies of the blades of the different blade types, the blades of the different blade types including:
   a first blade of a first of the different blade types having a first continuous internal channel extending between two first openings to an exterior of the bladed rotor, the two first openings being located on a hub of the bladed rotor, the first continuous internal channel being closed between the two first openings; and
   a second blade of a second of the different blade types having a second continuous internal channel extending between two second openings to the exterior of the bladed rotor, the two second openings being located on the hub of the bladed rotor, the second continuous internal channel being closed between the two second openings, the first and second continuous internal channels having different shapes.

2. The bladed rotor as defined in claim 1, wherein the first and second blades have blade root fillets of different geometries.

3. A mistuned bladed rotor comprising a plurality of circumferentially distributed blades, two or more of the blades having identical external aerodynamic surfaces and having different internal configurations selected to provide the two or more blades with different natural frequencies, a first of the two or more blades having a first continuous internal channel extending between two first openings to an exterior of the bladed rotor, the two first openings being located on a hub of the bladed rotor, the first continuous internal channel being closed between the two first openings, a second of the two or more blades having a second continuous internal channel extending between two second openings to the exterior of the bladed rotor, the two second openings being located on the hub of the bladed rotor, the second continuous internal channel being closed between the two second openings, the first and second internal channels having different shapes.

4. The bladed rotor as defined in claim 3, wherein the two first openings are located on a same side of the hub of the bladed rotor.

5. The bladed rotor as defined in claim 3, wherein the two first openings are located on opposite axial sides of the hub of the bladed rotor.

6. The bladed rotor as defined in claim 3, wherein the two first openings are occluded by respective plugs.

7. The bladed rotor as defined in claim 3, wherein the first internal channel extends into the hub of the bladed rotor.

8. The bladed rotor as defined in claim 3, wherein the two first openings are located in a rim portion of the hub of the bladed rotor.

9. The bladed rotor as defined in claim 3, wherein the bladed rotor is a centrifugal impeller.

10. The bladed rotor as defined in claim 3, wherein the bladed rotor is a bladed disk.

11. The bladed rotor as defined in claim 3, wherein the first and second blades are adjacent one another.

12. A method of manufacturing a mistuned bladed rotor, the method comprising forming blades of the rotor according to two or more different blade types, each of the different blade types defining an identical external aerodynamic surface and a different internal configuration selected to provide different natural frequencies of the blades of the different blade types, the blades of the different blade types including:
   a first blade of a first of the different blade types having a first continuous internal channel extending between two first openings to an exterior of the bladed rotor, the two first openings being located on a hub of the rotor, the first continuous internal channel being closed between the two first openings; and
   a second blade of a second of the different blade types having a second continuous internal channel extending between two second openings to the exterior of the bladed rotor, the two second openings being located on the hub of the rotor, the second continuous internal channel being closed between the two second openings, the first and second continuous internal channels having different shapes.

13. The method as defined in claim 12, comprising using additive manufacturing to form the first and second blades.

14. The method as defined in claim 12, further comprising:
   subjecting the first and second blades to hot isostatic pressing; and
   subjecting the first and second continuous internal channels to abrasive flow machining.

15. The method as defined in claim 12, comprising occluding the two first openings using respective plugs.

16. The method as defined in claim 12, wherein the first and second blades have root fillets of different geometries.

\* \* \* \* \*